Figure 1:
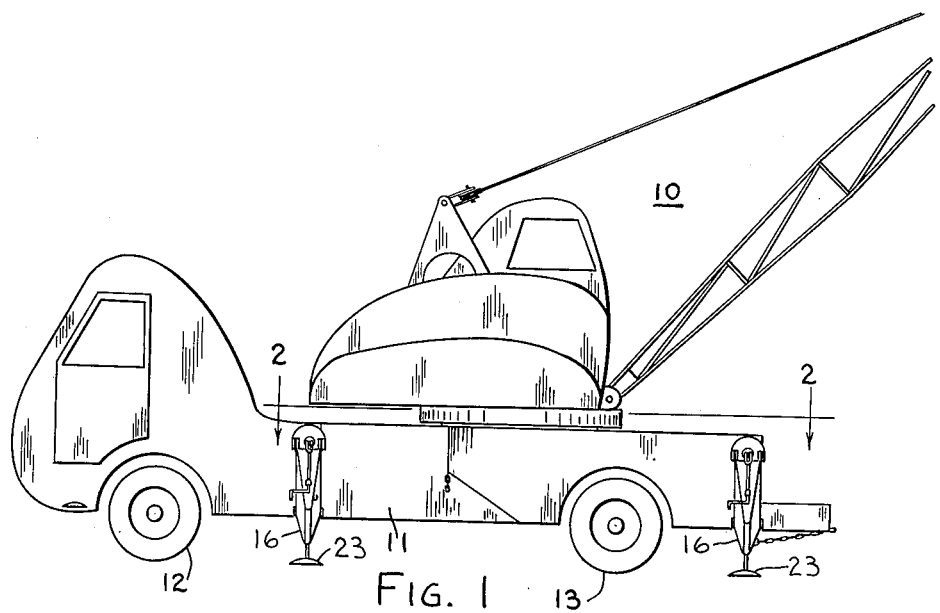

May 8, 1945.  H. A. WAGNER ET AL  2,375,264
VEHICLE STABILIZING ARRANGEMENT
Filed Feb. 9, 1944  2 Sheets-Sheet 1

Harold A. Wagner
Gustave H. Wagner
INVENTORS

BY
*E. A. Buckhorn*
Attorney

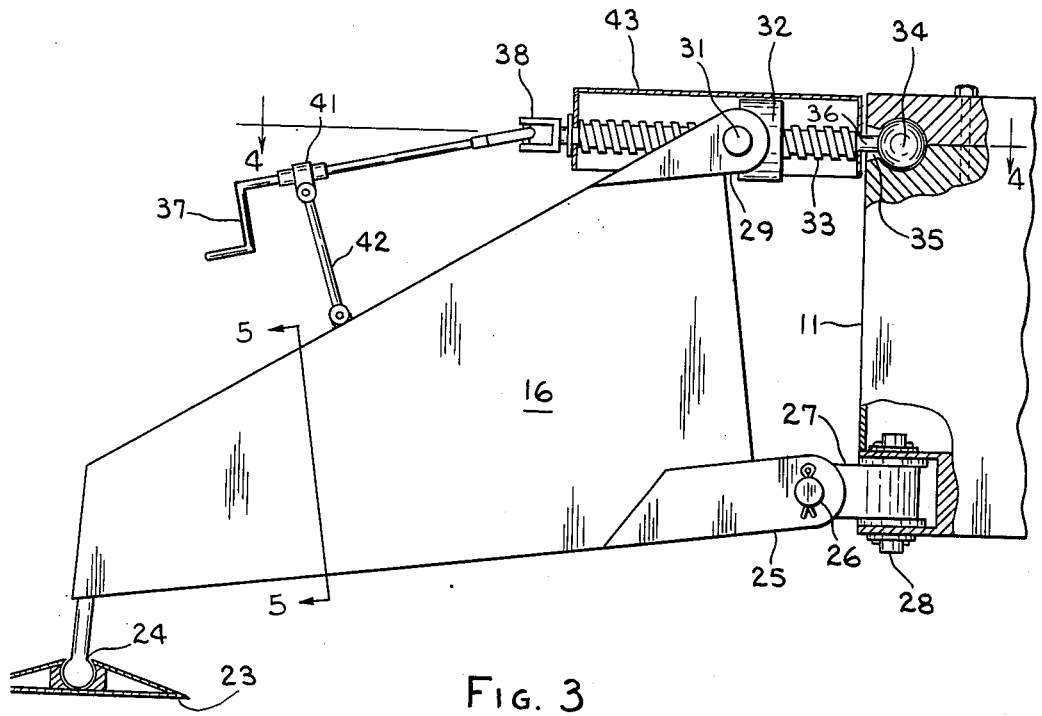
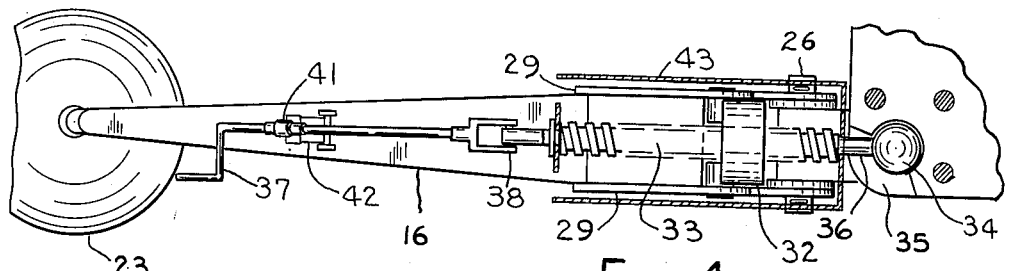
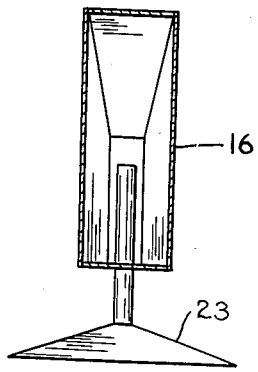

Patented May 8, 1945

2,375,264

UNITED STATES PATENT OFFICE 2,375,264

VEHICLE STABILIZING ARRANGEMENT

Harold A. Wagner and Gustave H. Wagner, Portland, Oreg.

Application February 9, 1944, Serial No. 521,651

9 Claims. (Cl. 212—145)

The present invention relates to stabilizing arrangements and, while not necessarily limited thereto, the arrangements of the invention are particularly adaptable for use with mobile machinery, such as vehicle mounted cranes, shovels and the like.

Certain types of portable machinery apparatus are mounted upon a vehicle chassis for facilitating movement of the apparatus from the site of one operation to the next. To facilitate travel over ordinary roads it is desirable that the overall width of the vehicle be standard but generally such a standard width wheelbase does not provide sufficient stability to the vehicle to permit satisfactory operation of the machinery. This is particularly true in the case of mobile cranes, shovels and the like having a relatively long boom which must be swung through a relatively wide angle from one side of the vehicle to the other, and which, when loaded, tends to unbalance the vehicle so that means must be provided for stabilizing the vehicle in setting up the machine for operation. Such stabilizing arrangements as have been provided heretofore have been relatively cumbersome requiring a long time to set up and even then are satisfactory only under limited conditions. It will be appreciated that such machinery as cranes and shovels working on construction projects must usually be set up on rough ground and frequently adjacent sloping shoulders. The usual types of stabilizers are not sufficiently flexible to permit setting up of the vehicle with a reasonable degree of stability except on level ground which, of course, is a serious limitation to the normal usage of the machine.

It is therefore an object of the present invention to provide a new and improved arrangement including a plurality of outrigger arms for stabilizing vehicle mounted apparatus in a stationary operating condition, the outrigger arms being capable of a wide range of adjustment so that they may be set up quickly and without requiring additional auxiliary equipment even on relatively rough ground, and at the same time providing a high degree of rigidity to the vehicle.

A further object of the invention is to provide a new and improved arrangement for stabilizing vehicle mounted machinery apparatus in a stationary operating position, the arrangement being characterized by simplicity in design, lightness in weight and of low manufacturing cost.

In accordance with an illustrated embodiment of the invention, the arrangement comprises a plurality of arms which are secured to the vehicle frame on the opposite sides thereof, each arm being pivotally secured relatively close to the vehicle frame for movement about a vertical axis in the horizontal direction so as to provide for folding of the arms inwardly toward the vehicle frame in an inoperative position as for travel, the arms being further provided for movement about a pivot extending horizontally about which the arms are adjustable by screw means whereby the outermost ends of the arms may be moved into engagement with the ground for stabilizing the vehicle frame.

For a consideration of what is believed novel and inventive, the attention is directed to the following specification and the accompanying drawings, while the features of novelty will be pointed out with greater particularity in the appended claims.

Figure 2:
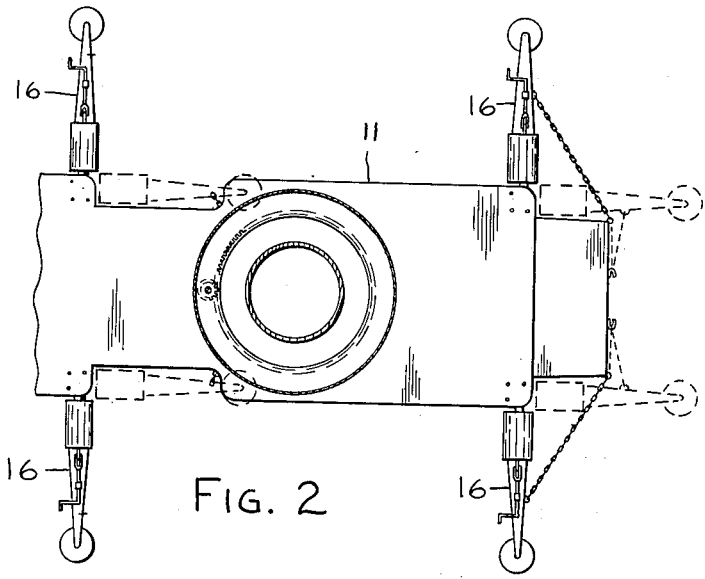

In the drawings, Fig. 1 is a side elevation of a vehicle mounted apparatus including a stabilizing arrangement constructed in accordance with one form of the present invention; Figure 2 is a plan view taken along the line 2—2 of Figure 1; Figure 3 is an enlarged view of one of the outrigger arms, certain portions thereof being broken away to illustrate more clearly certain structural details thereof; Figure 4 is a plan view of the arm taken along the line 4—4 of Figure 3; and Figure 5 is a cross sectional view taken along the line 5—5 of Figure 3.

Referring first to Figures 1 and 2, a load handling machine, such as a mobile crane, is indicated generally at 10 and shown mounted upon a truck vehicle comprising a base frame 11 supported by wheels 12, 13. Secured to each of the opposite sides of the frame 11 are a pair of outrigger arms 16 which are shown in the outwardly extending position, the outer ends of the outriggers being adjusted into engagement with the ground for stabilizing the vehicle frame to facilitate satisfactory operation of the crane. While in the particular embodiment illustrated the outriggers are provided on a mobile crane apparatus, it will readily be understood by those skilled in the art that the outriggers as shown may equally well be used in connection with any other form of vehicle mounted apparatus which is required to be stabilized in a stationary operative position.

The outrigger arms 16, as illustrated more clearly in the enlarged view of Figures 3 and 4 are of a generally triangular shape, being relatively wide and high at the inner end, that is, adjacent the vehicle frame and tapered both as to width and height toward the outermost end.

While the arms may be of any suitable construction, they are preferably of a hollow, box-like, welded fabrication as illustrated by the sectional view Figure 5. Such construction is mechanically strong, relatively light in weight, as well as inexpensive. Upon the outermost end of the arm is mounted a ground engaging foot plate 23 and which is supported for limited pivotal movement, such as by a ball and socket connection 24 whereby the plate 23 may adjust itself into flat engagement with the surface of the ground.

The arms 16 are each secured to the vehicle frame by a pair of vertically spaced pivotal connections so constructed and arranged that the arms in the raised position may be swung about a vertical axis in the horizontal direction from the outwardly extending operative position as shown in full line in Figures 1 and 2 to the folded, or inoperative position, alongside the vehicle frame as illustrated by the dotted lines in Figure 2. The pivotal connections are furthermore so arranged that the arms may also be adjusted for movement in the vertical plane about a horizontal axis to bring the foot plates 23 into engagement with the ground. Referring to Figures 3 and 4, the lowermost corner of the inner or high end of the arm 16 is provided with a pair of bracket arms 25 and which are pivotally secured by means of a pin 26 to a block 27 arranged between the arms 25. The other end of the block 27 is pivotally secured by means of the vertically extending pin 28 to a lower portion of the vehicle frame 11. The upper corner of the inner end of the arm 16 is also provided with a pair of outwardly extending bracket arms 29 through which project the horizontally extending trunnions 31 rigidly secured to the nut 32, which nut is threadedly arranged upon the screw 33. The innermost end of the screw 33 is provided with a ball 34 cooperatively arranged within a split socket provided on the upper portion of the vehicle frame 11. A slot opening 35 providing access to the socket for the neck portion 36 of the screw extends horizontally through an angle somewhat greater than 90 degrees. The ball and socket of the connection for the upper portion of the outrigger arm is vertically aligned with the lower pin 28 so as to provide for swinging movement of the arm 16 in the horizontal direction.

The screw 33 may be rotated by means of a hand crank 37 connected thereto through a swivel 38 to cause travel of the nut 32 therealong and pivotal movement of the arm 16 about the horizontal axis of the pin 26. The crank 37 is rotatably arranged within a collar 41 and which collar is in turn hingedly supported by bracket 42 to the upper surface of the arm 16. A suitable cover 43 is provided over the screw 33 to prevent sand, gravel or dirt from falling thereupon. It will be observed that the slot 35 providing access to the ball socket in the vehicle frame is of a sufficient height so as to allow for the slight up and down movement of the screw 33 as the nut is shifted longitudinally thereof, due to the fact that the nut 32 describes an arc about the horizontal pivoted axis of pin 26.

It will be apparent that the outrigger arm arrangement of the present invention is easy to operate and extremely flexible so that it can be set up for stabilizing the vehicle under practically any condition. Not only can the arms be individually adjusted within a wide horizontal angle, but also throughout a wide vertical angle. Because the distance between the pivot pin 26 and the nut 32 is relatively short as regards the length of the arm 16, a relatively short range of adjustment of the nut 32 upon the screw 33 will provide for a very much longer range of adjustment for the outer end of the arm. This is of great importance when setting up the machine for operation on uneven ground where the shoulders adjacent the machine may slope away either downwardly or upwardly.

In the dotted lines in Figure 2 the outrigger arms are shown in the inoperative position swung back against the vehicle frame and extending longitudinally from the rear end of the vehicle which positions they will occupy when the vehicle is moved from one site of operation to the next. For retaining the outrigger arms in the inoperative position, as during traveling, suitable retainer hooks may be provided as indicated.

Having described the principle of operation of the invention in what is considered to be the preferred embodiment thereof, it is desired that it be understood that the various specific details shown are merely illustrative, and that the invention may be carried out by other means.

We claim:

1. An outrigger arrangement for a vehicle mounted apparatus comprising an outrigger arm mounted upon the vehicle frame, a pair of pivot means securing said arm to said frame, the pivotal axes of said pivot means extending at right angles with respect to each other, the axis of one of said pivot means extending vertically to permit folding of said arm against the vehicle frame, the axis of the other of said pivot means extending horizontally about which said arm may be raised and lowered relative to the ground, and means for controlling the degree of pivotal movement of said arm about said horizontal axis.

2. A stabilizing arrangement for a vehicle mounted apparatus comprising an outrigger arm mounted upon the vehicle frame and adapted to be adjusted into engagement with the ground for stabilizing said vehicle, said arm including a pivotal joint relatively close to the vehicle frame providing for movement of said arm about a vertical axis to a folded position against the vehicle, said arm also including a pivotal joint relatively close to the vehicle frame providing for movement of said arm about a horizontal axis, and screw means for controlling movement of said arm about said horizontal axis whereby the outermost end of said arm may be raised and lowered relative to the ground.

3. A stabilizing arrangement for a mobile apparatus comprising a vehicle frame, a plurality of outrigger arms mounted on opposite sides of the frame, the outer ends of said arms being adapted to be adjusted into engagement with the ground for stabilizing said frame, a pair of vertically spaced apart means securing each of said arms to said frame for swinging movement about a vertical axis, the lower one of said means including a horizontal pivot and means connected between said arm and said frame for effecting lowering of said arm into engagement with the ground, said arm in the elevated position being foldable into a position longitudinally of said frame about said vertical axis.

4. A stabilizer arrangement for a vehicle mounted apparatus comprising a vehicle frame, an arm, a pair of vertically spaced pivot means supporting one end of said arm upon said frame, said pivot means having a common axis extending vertically about which said arm may be folded against said vehicle frame, a second pivot means securing a lower portion of said arm end to said first mentioned pivot means, the axis of said second pivot means extending horizontally about which said arm may be raised and lowered relative to the ground, and screw means connected between said arm and said first mentioned pivot means for adjustably controlling the degree of pivotal movement of said arm about the second pivot means, said screw means being vertically spaced from said second pivot means.

5. A stabilizer for a vehicle mounted apparatus comprising a vehicle frame, an arm having an outer end portion adapted to engage with the ground, pair of vertically spaced pivot means securing one end of said arm to said frame permitting pivotal movement of said arm in the horizontal direction, the lower one of said pair of pivot means including a horizontal pivot permitting pivotal movement of said arm thereabout in the vertical direction, the upper one of said pair of pivot means including means for controlling the position of adjustment of said arm in the vertical plane.

6. A stabilizer arrangement for a vehicle mounted apparatus comprising a vehicle frame, a plurality of arms attached to the opposite sides of said vehicle frame and adapted to engage with the ground when said vehicle is in a stationary position, each of said arms having a relatively wide vertically extending end portion, a pair of vertically spaced apart pivot means securing said wide end portion of said arm to said frame permitting movement of said arm in the horizontal direction, a second pivot means securing the lower portion of said arm end to the lowermost of said first pair of pivot means and screw means connected between the upper portion of said arm end to the uppermost of said first pair of pivot means for controlling the angular movement of said arm about said second pivot means.

7. A stabilizing arrangement for a vehicle frame comprising a plurality of bracket arms hingedly secured to each of the opposite sides of the vehicle frame for movement in the horizontal direction, pivot means securing a lower end portion of each of said arms to said frame permitting pivotal movement of said arms in the vertical direction, and means connected between an upper end portion of each of said arms and said frame for controlling the angular position of said arms relative to said frame in the vertical plane.

8. A stabilizing arrangement for a vehicle frame comprising a plurality of bracket arms secured to each of the opposite sides of the vehicle frame, a first pivot means securing one end of said arms to said frame, the axis of said first pivot means extending vertically permitting swinging movement of said arms in a horizontal direction from a position alongside said frame to a position extending outwardly therefrom, a second pivot means between said end of said arms and said frame permitting angular movement of said arms in the vertical plane, and means connected between said arms and said frame for controlling said angular movement of said arms.

9. A stabilizing arrangement for a vehicle frame comprising a plurality of bracket arms, hinge means securing one end of said arms to said frame permitting swinging movement of said arms in a horizontal direction from a position alongside said frame to a position at right angles to said frame, pivot means arranged in series connection with said hinge means between said ends of said arms and said frame and screw means vertically spaced from said pivot means and connected between said arms and said frame for effecting raising and lowering of the outer ends of said arms relative to the surface of the ground.

HAROLD A. WAGNER.
GUSTAVE H. WAGNER.